Figure 1:
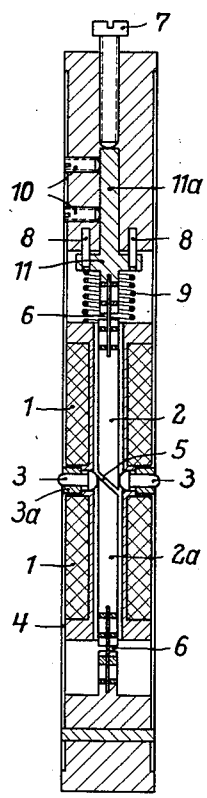

Oct. 29, 1940.                M. KRUSE                 2,219,708
            DEVICE FOR MEASURING LENGTHS ON AN ELECTROMAGNETIC BASE
                         Filed Nov. 14, 1938

Inventor:
Michael Kruse,
By Potter, Pierce & Scheffler,
Attorneys.

Patented Oct. 29, 1940

2,219,708

UNITED STATES PATENT OFFICE 2,219,708

DEVICE FOR MEASURING LENGTHS ON AN ELECTROMAGNETIC BASE

Michael Kruse, Hamburg, Germany, assignor to Bauer & Schaurte, Neuss, Rhine, Germany Application November 14, 1938, Serial No. 240,412
In Germany October 16, 1937

6 Claims.  (Cl. 177—351)

This invention relates to an improved device for measuring lengths by the electromagnet principle disclosed in the United States patent application Serial Number 210,539 of Pampel and Harder, filed May 27, 1938. In the device shown and described in said application the measurement is obtained by varying the inductive resistance of an alternating-current choking coil having in its interior a variable air gap.

The present improvement, while embodying the principle embodied in the measuring device forming the subject-matter of the prior application, aims at making the device particularly suitable for internal measurements in long and narrow bores. This is attained by designing the device in such a manner that the variations of the air gap between the oppositely located ends of the cores are produced by lateral movements of the cores, or of the ends of the cores, transversely to the axial direction of the cores, in contradistinction to the former arrangement in which the cores are moved axially in order to vary the width of the air gap. In said former arrangements the end faces of the cores are positioned at right angles with respect to the core axis, whereas in the present improved design said core faces either are angularly disposed with respect to the core axis or are stepped. Therefore, the air gap does not extend transversely with respect to the core axis, but its position corresponds with the shape of the end faces of the core. The lateral movements of the cores, or of the ends of the cores, are brought about by feeler pins arranged at right angles with respect to the cores. In order to provide for the space necessary to house said pins in an appropriate manner the choke coil is divided and a space is left between the halves of the coil and the corresponding cores, this space establishing at the same time the air gap to be varied with the aid of the said pins.

Designing the device in this way makes it extraordinarily compact and particularly useful for measuring, for instance, the bores of gun barrels and similar long and narrow bores.

By varying the air gap between the coil cores also the inductive resistances of the two halves of the choking coil are varied. These two halves are arranged in the branches of a Wheatstone bridge not shown so as to measure said variations in a known manner.

The sensitiveness of such an arrangement having a variable air gap depends on the length of this gap, and in order to be able to adjust the sensitiveness of the measuring implement, means are provided by which the width of the air gap can be varied without varying also the distance between the feeler pins. This presents an important advantage over the former construction as disclosed in the above mentioned former application in which the width of the air gap is invariable. The variation of the air gap can be effected, for instance, by shifting one of the coil cores in direction of its axis by means of a micrometric screw.

Figure 2:
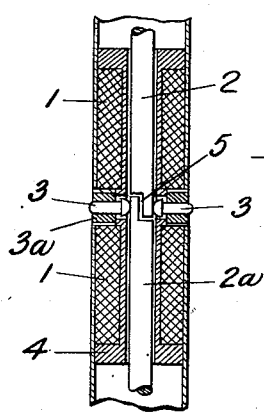

The invention is illustrated diagrammatically and by way of example in the accompanying drawing in which Fig. 1 is a longitudinal section through one form of measuring devices embodying the principles of the invention; and Fig. 2 is a fragmentary longitudinal section through another form of measuring devices constructed in accordance with the invention.

On the drawing, 1 denotes the choking coil which is divided into two parts, as is also the core, there being, thus practically two cores 2, 2a. There is a space between the two coil parts and through this space extend two feeler pins 3 guided by sleeves 3a; said pins or said sleeves or both members consist of a nonmagnetic material so that no magnetic closure can arise between said pins and a jacket 4 which encloses all said members. In the constructional form shown by way of example the pins 3 are arranged transversely with respect to the longitudinal axis of the device. The core end faces which are located opposite to one another are oblique in that example, preferably at an angle of from 30 to 45°, and they form between them the air gap 5. If either one of the pins is moved towards the other, the width of the gap will be varied.

The other ends of the cores are connected with plate springs 6 forming a sort of hinge for the cores, but if these latter have only a very small diameter springs may be dispensed with, as such cores are sufficiently elastic by themselves. In order to prevent the core 2 from turning relatively to the core 2a whereby the proper parallelism of the oblique core faces would be disturbed which must be avoided, two pins 8 are provided which engage a member 11 firmly connected with the upper end of the plate spring pertaining to the core 2. The member 11 is at its lower end subjected to the pressure of a helical compression spring 9, and is at its upper portion provided with an upwardly directed extension 11a bearing against a micrometric screw 7 by which the core 2 can be very accurately adjusted with respect to the core 2a in order to provide for the absolutely proper width of the gap 5. After having adjusted the gap 5 the member 11, 11a can be held in position by two set screws 10.

In the form of the invention shown in Fig. 2, the parts are identical with those shown in Fig. 1 except that the adjacent ends of the cores 2, 2a are stepped to provide an air gap 5 variable by lateral pressure.

The improved device as disclosed permits the measurement of internal diameters down to 10 mm. and even less and it is particularly suited for long and narrow bores as has been mentioned in the introductory part of this specification. The measuring device can be shoved into the bore or bores concerned as deep as desired which may be effected, for instance, with the aid of an appropriately long handle, say a tube or the like, attached to an end of the device.

I wish it to be understood that the invention is not limited to constructional forms serving merely for internal measurements; also other constructional forms suited for other measurements can be designed without departing from the invention.

I claim:

1. A device for the measurement of internal dimensions comprising an elongated container, an alternating current choke coil divided into two axially aligned portions positioned within said container, a core member positioned axially in each of said coil portions, the adjacent ends of said core members having overlapping faces spaced to provide an air gap therebetween adapted to be varied in extent by movement of said cores transversely to the axial direction, and a radially extending movable feeler pin associated with each of said core members, one end of said pins projecting beyond the outer surface of said container and the other end of said pins engaging the core member associated therewith adjacent the end of said core member.

2. A device for the measurement of internal dimensions comprising an elongated container, an alternating current choke coil divided into two axially aligned portions positioned within said container, a core member positioned axially in each of said coil portions, the adjacent ends of said core members being complementarily tapered to provide an air gap therebetween adapted to be varied in extent by movement of said cores transversely to the axial direction, and a radially extending movable feeler pin associated with each of said core members, one end of said pins projecting beyond the outer surface of said container and the other end of said pins engaging the core member associated therewith adjacent the end of said core member.

3. A device for the measurement of internal dimensions comprising an elongated container, an alternating current choke coil divided into two axially aligned portions positioned within said container, a core member positioned axially in each of said coil portions, the adjacent ends of said core members being complementarily stepped to provide an air gap therebetween adapted to be varied in extent by movement of said cores transversely to the axial direction, and a radially extending movable feeler pin associated with each of said core members, one end of said pins projecting beyond the outer surface of said container and the other end of said pins engaging the core member associated therewith adjacent the end of said core member.

4. A device for the measurement of internal dimensions comprising an elongated container, an alternating current choke coil divided into two axially aligned portions positioned within said container, a core member positioned axially in each of said coil portions, the adjacent ends of said core members having overlapping faces spaced to provide an air gap therebetween adapted to be varied in extent by movement of said cores transversely to the axial direction, and a radially extending movable feeler pin associated with each of said core members, one end of said pins projecting beyond the outer surface of said container and the other end of said pins engaging the core member associated therewith adjacent the end of said core member.

5. A device for the measurement of internal dimensions comprising an elongated container, an alternating current choke coil divided into two axially aligned portions positioned within said container, a core member positioned axially in each of said coil portions, the adjacent ends of said core members having overlapping faces spaced to provide an air gap therebetween adapted to be varied in extent by movement of said cores transversely to the axial direction, a radially extending movable feeler pin associated with each of said core members, one end of said pins projecting beyond the outer surface of said container and the other end of said pins engaging the core member associated therewith adjacent the end of said core member, and means for varying the extent of the air gap independently of said feeler pins.

6. A device for the measurement of internal dimensions comprising an elongated container, an alternating current choke coil divided into two axially aligned portions positioned within said container, a core member positioned axially in each of said coil portions, the adjacent ends of said core members having overlapping faces spaced to provide an air gap therebetween adapted to be varied in extent by movement of said cores transversely to the axial direction, a radially extending movable feeler pin associated with each of said core members, one end of said pins projecting beyond the outer surface of said container and the other end of said pins engaging the core member associated therewith adjacent the end of said core member, and means for adjusting the position of one of said cores in the axial direction to vary the extent of the air gap independently of said feeler pins.

MICHAEL KRUSE.